United States Patent
Hikita

(10) Patent No.: US 8,236,374 B2
(45) Date of Patent: Aug. 7, 2012

(54) METHOD OF MANUFACTURING OPTICAL WAVEGUIDE DEVICE

(75) Inventor: Takami Hikita, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 812 days.

(21) Appl. No.: 12/397,069

(22) Filed: Mar. 3, 2009

(65) Prior Publication Data
US 2009/0223626 A1   Sep. 10, 2009

(30) Foreign Application Priority Data
Mar. 4, 2008   (JP) .................................. 2008-053618

(51) Int. Cl.
*B32B 38/10* (2006.01)
(52) U.S. Cl. ........................................ 427/162; 156/250
(58) Field of Classification Search .................. 427/162; 156/250
See application file for complete search history.

(56) References Cited

U.S. PATENT DOCUMENTS

| | | | |
|---|---|---|---|
| 5,195,162 A | 3/1993 | Sultan et al. | |
| 5,369,722 A | 11/1994 | Heming et al. | |
| 2006/0091571 A1* | 5/2006 | Akutsu et al. | 264/1.24 |
| 2006/0120681 A1 | 6/2006 | Mune et al. | |

FOREIGN PATENT DOCUMENTS

| | | |
|---|---|---|
| EP | 0533074 A1 | 3/1993 |
| JP | 02-000903 A | 1/1990 |
| JP | 2001-264557 A | 9/2001 |
| JP | 2004-114207 A | 4/2004 |
| JP | 2006-023374 A | 1/2006 |
| JP | 2006-23375 A | 1/2006 |
| JP | 2006-023375 A | 1/2006 |
| JP | 2006-154447 A | 6/2006 |
| JP | 2007-086330 A | 4/2007 |
| JP | 2007-241190 A | 9/2007 |

OTHER PUBLICATIONS

Chinese Office Action dated Jun. 23, 2011, issued in corresponding Chinese Patent Application No. 200910118142.7.
Japanese Office Action dated Jan. 5, 2012, issued in corresponding Japanese Patent Application No. 2008-053618.
European Search Report dated Jun. 15, 2009, issued in corresponding European Patent Application No. 09153512.0.

* cited by examiner

*Primary Examiner* — Khanh P Nguyen
*Assistant Examiner* — Margaret Squalls
(74) *Attorney, Agent, or Firm* — Westerman, Hattori, Daniels & Adrian, LLP

(57) ABSTRACT

A method of manufacturing an optical waveguide device is provided which provides the excellent smoothness of a light receiving end surface and a light emitting end surface formed by cutting and which provides excellent productivity. A laminate of a film element (2) and a board (1) is prepared. The film element (2) includes at least one future optical waveguide portion. The board (1) is stacked on the film element (2). The laminate is die-cut from the side of the board (1). This provides an optical waveguide device including the die-cut board (1) and an optical waveguide formed thereon. A cutting die used for the die-cutting includes at least blades (3) for forming the light receiving end surface (20a) and the light emitting end surface (20b) of the optical waveguide. The blades (3) are flat blades including blade surfaces having an arithmetic means roughness (Ra) of less than 0.02 μm.

2 Claims, 4 Drawing Sheets

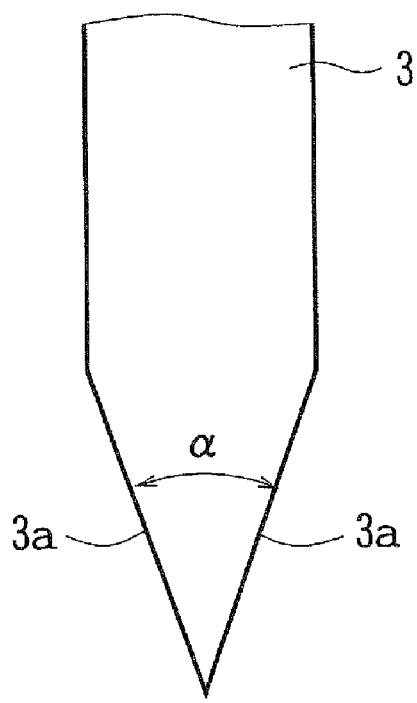 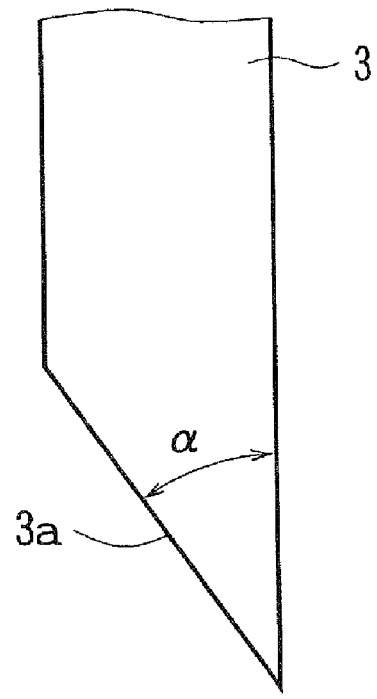
F i g . 2 ( a )   F i g . 2 ( b )

METHOD OF MANUFACTURING OPTICAL WAVEGUIDE DEVICE

BACKGROUND OF THE INVENTION

1. Field of the Invention

The present invention relates to a method of manufacturing an optical waveguide device which provides an optical waveguide for widespread use in optical communications, optical information processing and other general optics together with a board.

2. Description of the Related Art

In general, an optical waveguide includes cores serving as a passageway for light and formed in a predetermined pattern on a board either directly or with an under cladding layer therebetween, and an over cladding layer formed to cover the cores. The optical waveguide is incorporated in an optical device such as an optical waveguide device, an optical integrated circuit, an optical wiring board and the like, and is used as a medium for propagating light from an optical element, an optical fiber and the like. In the use of the optical waveguide, the optical element, the optical fiber or the like is typically joined to a light receiving end surface and a light emitting end surface of the optical waveguide. Thus, the light receiving end surface and the light emitting end surface of the optical waveguide are required to be smooth for the purpose of reducing light propagation losses (coupling losses) due to the joining.

There has been proposed a method of manufacturing the above-mentioned optical waveguide as described below. This method is disclosed in Japanese Patent Application Laid-Open No. 2006-23375. First, an under cladding layer is formed over substantially the entire surface of a sizeable board, and a plurality of cores are formed in a plurality of regions, respectively, of the under cladding layer. Next, an over cladding layer is formed over the entire upper surface of the under cladding layer so as to cover the plurality of cores. This provides a film element composed of the under cladding layer, the cores and the over cladding layer on the board. The regions in which the cores are formed are future optical waveguide portions in which the optical waveguide is to be formed. Next, the film element is cut or diced together with the board into a plurality of pieces corresponding to the respective future optical waveguide portions one by one with a blade (a rotary blade). This provides a plurality of optical waveguide devices separated from each other and each including the optical waveguide formed on the diced board.

The above-mentioned dicing achieves a smooth light receiving end surface and a smooth light emitting end surface because the dicing is performed while the blade grinds the cut surfaces. Thus, joining the smooth light receiving end surface and the smooth light emitting end surface to the optical element, the optical fiber or the like reduces the coupling losses at the joints to achieve efficient light propagation using the optical waveguide as a medium.

However, the dicing which is cutting using the rotary blade is required to be performed for each cut surface. Additionally, the optical waveguide is often complicated in overall shape depending on the applications thereof. For these reasons, the process of dicing the film element formed with the plurality of future optical waveguide portions into the plurality of pieces corresponding to the respective future optical waveguide portions one by one results in low productivity.

To solve the problem, the present inventor has studied a cutting method by die-cutting using a cutting die. This has improved the productivity, but has provided less smooth cut surfaces than those obtained by dicing to result in accordingly increased coupling losses at the cut surfaces.

SUMMARY OF THE INVENTION

In view of the foregoing, it is therefore an object of the present invention to provide a method of manufacturing an optical waveguide device which provides the excellent smoothness of a light receiving end surface and a light emitting end surface formed by cutting and which provides excellent productivity.

To accomplish the above-mentioned object, a method of manufacturing an optical waveguide device comprises the steps of: forming a film element on a board to provide a laminate of the film element and the board, the film element including at least one future optical waveguide portion, the board being stacked on the film element; and die-cutting the laminate with a cutting die to obtain the at least one future optical waveguide portion of the film element together with a portion of the board corresponding to the at least one future optical waveguide portion, thereby manufacturing an optical waveguide device including the portion of the board and an optical waveguide having a light receiving end surface and a light emitting end surface, wherein the cutting die includes at least blades for forming the light receiving end surface and the light emitting end surface, and the blades are flat blades including blade surfaces having an arithmetic means roughness (Ra) of less than 0.02 µm, and wherein the die-cutting is performed from the board side.

Based on the attempts related to the die-cutting method, the present inventor has made studies of the die-cutting method using a cutting die so as to obtain an optical waveguide including a light receiving end surface and a light emitting end surface which are excellent in smoothness. In the course of the studies, the present inventor has found that the smoothness of the cut surfaces depends on the blades of the cutting die and the sequence of cutting (or a die-cutting direction). As a result of further studies, the present inventor has found that the use of flat blades including blade surfaces having an arithmetic mean roughness (Ra) of less than 0.02 µm as the blades of the cutting die for die-cutting and the die-cutting performed using the cutting die from the board side provide the smooth cut surfaces to achieve sufficiently low coupling losses at the light receiving end surface and the light emitting end surface of the obtained optical waveguide. Thus, the present inventor has attained the present invention.

The reason why the light receiving end surface and the light emitting end surface of the obtained optical waveguide according to the present invention are excellent in smoothness is not clear but is considered as follows. The die-cutting performed from the board side suppresses a crack in the film element. Additionally, the use of the flat blades including the blade surfaces having an arithmetic mean roughness (Ra) of less than 0.02 µm as the blades of the cutting die for die-cutting relaxes stresses applied to the film element during the die-cutting. The suppression of a crack in the film element and the stress relaxation in combination contribute to the excellent smoothness of the light receiving end surface and the light emitting end surface.

The method of manufacturing an optical waveguide device according to the present invention obtains the optical waveguide device by the die-cutting using a cutting die, thereby to provide excellent productivity. Further, the cutting die includes at least blades for forming the light receiving end surface and the light emitting end surface, and the blades are flat blades including blade surfaces having an arithmetic means roughness (Ra) of less than 0.02 µm. Additionally, the die-cutting is performed from the board side. Therefore, the light receiving end surface and the light emitting end surface formed by the die-cutting are excellent in smoothness.

When the at least one future optical waveguide portion includes cores and a cladding layer which are made of an epoxy resin composition, the cut surfaces are made smooth if the cutting rate is increased. The method provides excellent productivity in this regard.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 2A and 2B are views illustrating blades of a cutting die for die-cutting for use in the method of manufacturing the optical waveguide device;

DESCRIPTION OF THE PREFERRED EMBODIMENTS

A preferred embodiment according to the present invention will now be described in detail with reference to the drawings.

Figure 1:
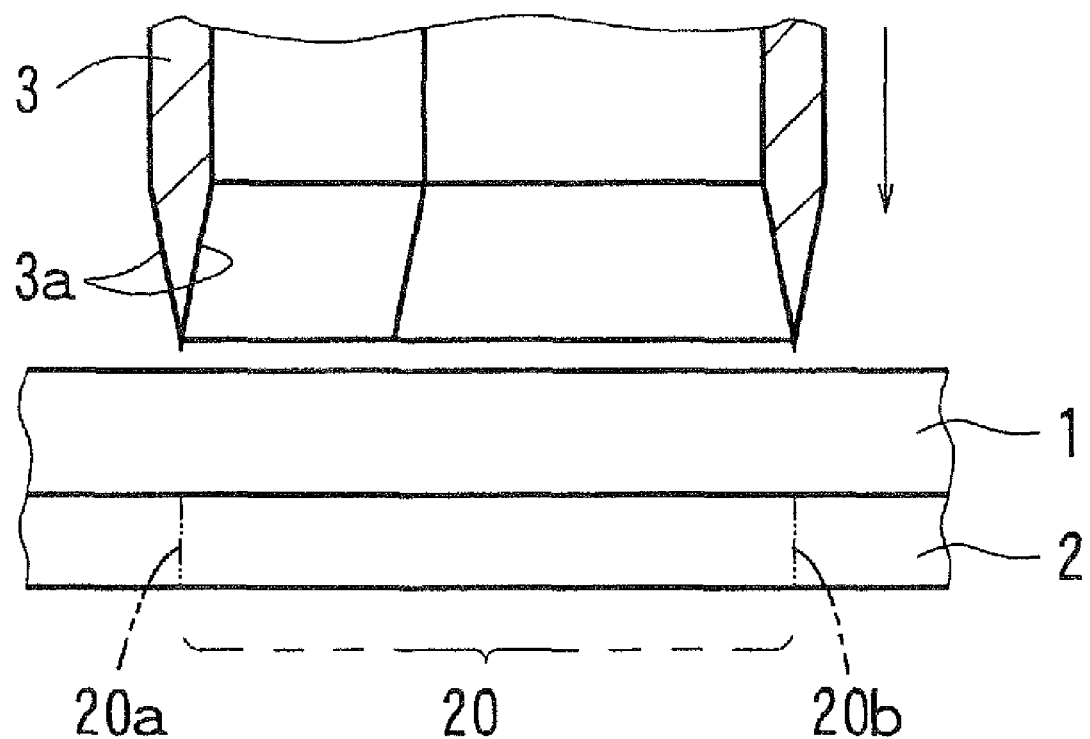
FIG. 1 is a view schematically illustrating a method of manufacturing an optical waveguide device according to a preferred embodiment of the present invention.
Figure 4:
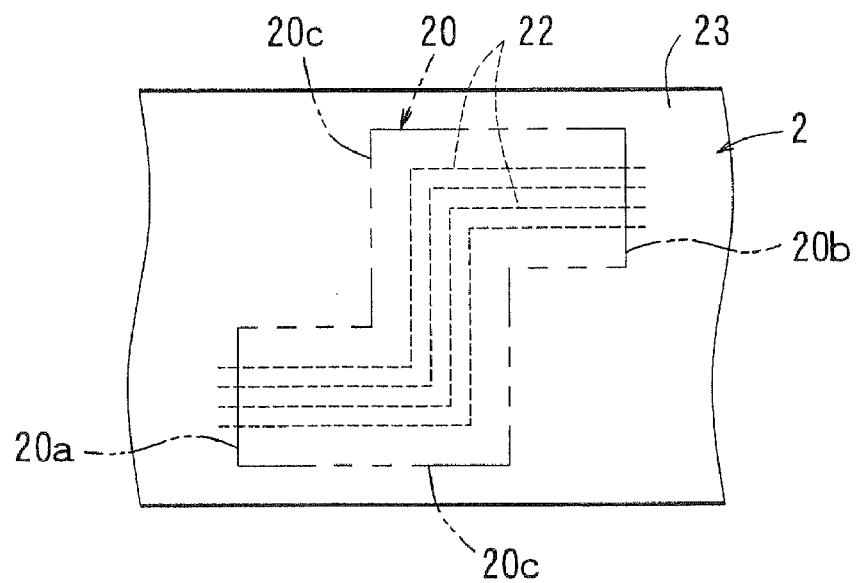
FIG. 4 is a plan view schematically showing the film element formed on the board.

FIG. 1 shows a method of manufacturing an optical waveguide device according to a preferred embodiment of the present invention. The method according to this preferred embodiment includes die-cutting a laminate of a film element 2 formed with a single future optical waveguide portion 20 (corresponding to a region in which cores 22 with reference to FIG. 4 are formed) and a board 1 stacked on the film element 2 from the side of the board 1 to provide a single optical waveguide device including the die-cut board 1 and an optical waveguide A (with reference to FIG. 5) crank-shaped as seen in plan view and including a light receiving end surface 20a and a light emitting end surface 20b, the optical waveguide A being formed integrally on the die-cut board 1. In this preferred embodiment, a cutting die (crank-shaped) for use in the above-mentioned die-cutting has blades 3 all of which are flat blades including blade surfaces 3a having an arithmetic mean roughness (Ra) of less than 0.02 μm.

Examples of each of the blades 3 used herein include a mirror blade (a double-edged blade) which is symmetric in edge shape and which has an included angle α on the order of 40 to 50 degrees as shown in FIG. 2A, a single-edged blade which is asymmetric in edge shape and which has an included angle α on the order of 30 to 60 degrees as shown in FIG. 2B, and the like. When the single-edged blade is used, a surface cut by the blade surface (inclined surface) 3a is an end surface of the optical waveguide.

An example of the method of manufacturing the optical waveguide device will be described in detail.

Figure 3:
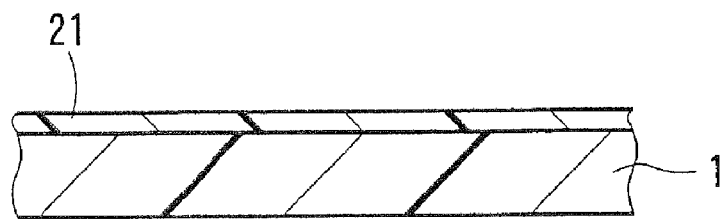
FIGS. 3A, 3B and 3C are views for schematically illustrating a method of producing a film element formed with a future optical waveguide portion on a board.
Figure 3:
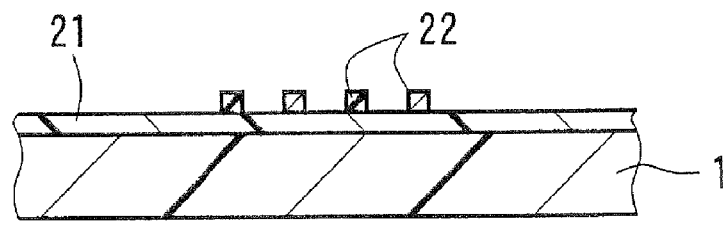
Figure 3:
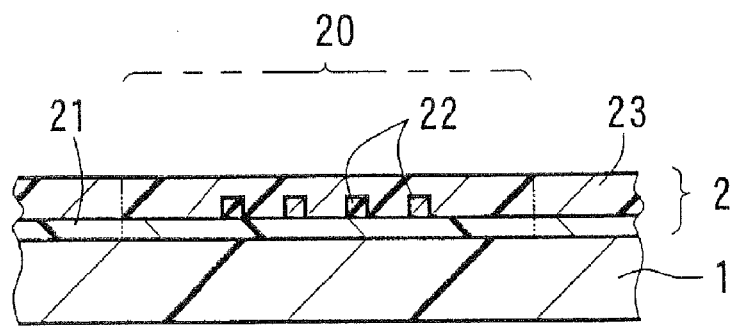

First, the board 1 is prepared with reference to FIG. 3A. Examples of a material for the formation of the board 1 preferably include resins such as polyethylene naphthalates (PEN), polyethylene terephthalates (PET) and the like in terms of ease of die-cutting. The thickness of the board 1 is in the range of 20 μm to 1 mm in terms of ease of die-cutting.

Then, a varnish prepared by dissolving a photosensitive resin in a solvent, which serves as a material for the formation of an under cladding layer 21 with reference to FIG. 3A, is applied to a predetermined region on the board 1. The application of this varnish is achieved, for example, by a spin coating method, a dipping method, a casting method, an injection method, an ink jet method and the like. Then, the varnish is dried by a heating treatment at 50° C. to 120° C. for 10 to 30 minutes, as required. This provides a photosensitive resin layer which is to be formed into the under cladding layer 21. Examples of the above-mentioned photosensitive resin include epoxy resin compositions, polyimide resin compositions and the like containing a photopolymerization initiator.

Next, the photosensitive resin layer is exposed to irradiation. Examples of the irradiation for the exposure used herein include visible light, ultraviolet light, infrared light, X-rays, alpha rays, beta rays, gamma rays and the like. Preferably, ultraviolet light is used. This is because the use of ultraviolet light achieves irradiation with large energy to provide a high rate of hardening, and an irradiation apparatus therefor is small in size and inexpensive to achieve the reduction in production costs. A light source of the ultraviolet light may be, for example, a low-pressure mercury-vapor lamp, a high-pressure mercury-vapor lamp, an ultra-high-pressure mercury-vapor lamp and the like. The dose of the ultraviolet light is typically 10 to 10000 mJ/cm², preferably 50 to 3000 mJ/cm².

After the above-mentioned exposure, a heating treatment is performed to complete a photoreaction. This heating treatment is performed at 80° C. to 250° C., preferably at 100° C. to 200° C., for 10 seconds to two hours, preferably for five minutes to one hour. This causes the above-mentioned photosensitive resin layer to be formed into the under cladding layer 21, as shown in FIG. 3A. The thickness of the under cladding layer 21 is typically in the range of 1 to 50 μm, preferably in the range of 5 to 30 μm.

Next, a photosensitive resin layer to be formed into the cores 22 with reference to FIG. 3B is formed on the surface of the under cladding layer 21. The formation of this photosensitive resin layer employs a varnish and is achieved by applying the varnish to a predetermined portion of the under cladding layer 21 in a manner similar to the process for forming the photosensitive resin layer which is to be formed into the under cladding layer 21 with reference to FIG. 3A. A material for the formation of the cores 22 used herein has a refractive index higher than that of the above-mentioned material for the formation of the under cladding layer 21 and a material for the formation of an over cladding layer 23 with reference to FIG. 3C to be described later. The adjustment of the refractive indices may be made, for example, by adjusting the selection of the types of the materials for the formation of the under cladding layer 21, the cores 22 and the over cladding layer 23 described above and the composition ratio thereof.

Thereafter, a photomask formed with an opening pattern corresponding to the cores 22 is placed over a portion of the photosensitive resin layer corresponding to the future optical waveguide portion 20 with reference to FIG. 3C. The photosensitive resin layer is exposed to irradiation through this photomask. Thereafter, a heating treatment is performed. The exposure to irradiation and the heating treatment are similar to those performed in the method of forming the under cladding layer 21.

Subsequently, the photosensitive resin layer is developed using a developing solution. This development dissolves away an unexposed portion of the photosensitive resin layer to cause portions of the photosensitive resin layer remaining on the under cladding layer 21 to be formed into the pattern of the cores 22. The above-mentioned development employs, for example, an immersion method, a spray method, a puddle method and the like. Examples of the developing solution used herein include an organic solvent, an organic solvent containing an alkaline aqueous solution, and the like. The developing solution and conditions for the development are selected as appropriate depending on the composition of the photosensitive resin layer.

After the above-mentioned development, the developing solution in the remaining portions of the photosensitive resin layer formed in the pattern of the cores 22 is removed by a heating treatment. This heating treatment is typically performed at 80° C. to 120° C. for 10 to 30 minutes. This solidifies the remaining portions of the photosensitive resin layer formed in the pattern of the cores 22 to form the cores 22. The cores 22 are formed in a region corresponding to the future optical waveguide portion 20 with reference to FIG. 3C. The thickness of the cores 22 is typically in the range of 10 to 150 μm, preferably in the range of 20 to 100 μm. The width of the cores 22 is typically in the range of 8 to 50 μm, preferably in the range of 10 to 25 μm.

Next, as shown in FIG. 3C, a photosensitive resin layer to be formed into the over cladding layer 23 is formed on the surface of the under cladding layer 21 so as to cover the cores 22. The formation of this photosensitive resin layer is similar to the process for forming the photosensitive resin layer which is to be formed into the under cladding layer 21 with reference to FIG. 3A. Thereafter, exposure to irradiation, a heating treatment and the like are performed in a manner similar to those in the process for forming the under cladding layer 21, to form the over cladding layer 23. The thickness of the over cladding layer 23 (as measured from the surface of the cores 22) is typically in the range of 5 to 100 μm, preferably in the range of 10 to 80 μm.

In this manner, the film element 2 formed with the future optical waveguide portion 20 is provided on the board 1. A plan view of the film element 2 is shown, for example, in FIG. 4, and exhibits a crank-shaped future optical waveguide portion 20 as mentioned above in this case. The cores 22 are also crank-shaped to extend along the crank-shaped future optical waveguide portion 20 in this case. The crank-shaped future optical waveguide portion 20 has a first end (the left-hand end in FIG. 4) and a second end (the right-hand end in FIG. 4) which are to be formed as the light receiving end surface 20a and the light emitting end surface 20b, respectively, by the subsequent die-cutting step. The reference numeral 20c designates side surfaces of the crank-shaped future optical waveguide portion 20. In terms of dimensional accuracy, it is preferable that the opposite end portions of the cores 22 in the film element 2 are previously formed to protrude from the cut surfaces (the light receiving end surface 20a and the light emitting end surface 20b). In FIG. 4, the cores 22 are indicated by broken lines, and the thickness of the broken lines indicates the thickness of the cores 22.

Figure 5:
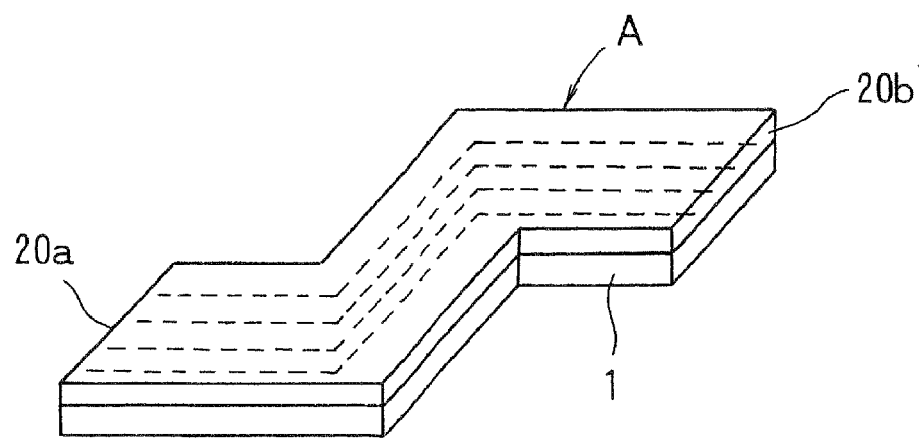
FIG. 5 is a perspective view schematically showing an optical waveguide device including an optical waveguide formed integrally on the die-cut board.

In this embodiment, as described above with reference to FIG. 1, the single optical waveguide device as shown in FIG. 5 is provided by die-cutting the future optical waveguide portion 20 of the laminate of the board 1 and the film element 2 from the side of the board 1 by using a predetermined crank-shaped cutting die. The predetermined cutting die has the blades 3 which are flat blades including blade surfaces 3a having an arithmetic mean roughness (Ra) of less than 0.02 μm.

Thus, die-cutting the laminate from the side of the board 1 by using the predetermined cutting die is one of the most striking characteristics of the present invention. Such die-cutting provides the smooth light receiving end surface 20a, the smooth light emitting end surface 20b and the smooth side surfaces 20c which are cut surfaces to ensure the high productivity of the optical waveguide device.

Then, an optical element, an optical fiber or the like is joined to the light receiving end surface 20a and the light emitting end surface 20b of the optical waveguide obtained in the manner according to the present invention. The propagation of light using the optical waveguide as a medium achieves the reduction in light propagation losses (coupling losses) due to the above-mentioned joining because the light receiving end surface 20a and the light emitting end surface 20b are smooth.

In this preferred embodiment, all of the blades 3 of the cutting die for use in the die-cutting are flat blades including the blade surfaces 3a having an arithmetic mean roughness (Ra) of less than 0.02 μm. Alternatively, the above-mentioned predetermined blades 3 may be used to form the light receiving end surface 20a and the light emitting end surface 20b, and a Thomson blade including a blade surface having an arithmetic mean roughness (Ra) of not less than 0.02 μm or the like may be used to form the side surfaces 20c other than the light receiving end surface 20a and the light emitting end surface 20b.

The single future optical waveguide portion 20 is formed in the film element 2 according to the above-mentioned preferred embodiment. However, a plurality of future optical waveguide portions 20 may be formed in the film element 2. In this case, the die-cutting using the above-mentioned cutting die may be performed on the plurality of future optical waveguide portions 20 either one by one or collectively.

Next, inventive examples of the present invention will be described in conjunction with comparative examples and reference examples. It should be noted that the present invention is not limited to the inventive examples.

EXAMPLES

Inventive Examples 1 to 4 and Comparative Examples 1 to 4

Material for Formation of Under Cladding Layer and Over Cladding Layer

A material for formation of an under cladding layer and an over cladding layer was prepared by dissolving 35 parts by weight of bisphenoxyethanol fluorene glycidyl ether, 40 parts by weight of 3',4'-epoxycyclohexylmethyl-3,4-epoxycyclohexane carboxylate which is an alicyclic epoxy resin (CELLOXIDE 2021P manufactured by Daicel Chemical Industries, Ltd.) 25 parts by weight of (3',4'-epoxycyclohexane)methyl-3',4'-epoxycyclohexyl-carboxylate (CELLOXIDE 2081 manufactured by Daicel Chemical Industries, Ltd.), and 2 parts by weight of a 50% propione carbide solution of 4,4'-bis [di(β-hydroxyethoxy)phenylsulfinio]phenyl-sulfide-bis-hexafluoroantimonate in ethyl lactate.

Material for Formation of Cores

A material for formation of cores was prepared by dissolving 70 parts by weight of bisphenoxyethanol fluorene glycidyl ether, 30 parts by weight of 1,1,1-tris{4-[2-(3-oxetanyl)]butoxyphenyl}ethane, and one part by weight of a 50% propione carbide solution of 4,4'-bis[di(β-hydroxyethoxy) phenylsulfinio]phenyl-sulfide-bis-hexafluoroantimonate in ethyl lactate.

Production of Laminate of Board and Film Element

The above-mentioned material for the formation of the under cladding layer was applied to a surface of a PET film (having a thickness of 188 µm) by using a bar coater. Thereafter, the material for the formation of the under cladding layer was exposed to ultraviolet irradiation at 2000 mJ/cm². Subsequently, a heating treatment was performed at 100° C. for 15 minutes to form the under cladding layer. The thickness of this under cladding layer was 10 µm when measured with a contact-type film thickness meter. The refractive index of this under cladding layer at a wavelength of 830 nm was 1.542.

Next, the above-mentioned material for the formation of the cores was applied to a surface of the under cladding layer by using a bar coater. Thereafter, a drying process was performed at 100° C. for 5 minutes. Next, a synthetic quartz based chrome mask (a photomask) formed with a linear opening pattern (having a width of 20 µm and a length of 3.5 mm) was placed over the material for the formation of the cores. Then, the material for the formation of the cores was exposed to ultraviolet irradiation at 2500 mJ/cm² by a contact exposure method through the mask. Thereafter, a heating treatment was performed at 85° C. for 15 minutes. Next, the material for the formation of the cores was developed using a 90% aqueous solution of γ-butyrolactone. This development dissolved away an unexposed portion of the material for the formation of the cores. Thereafter, a heating treatment was performed at 100° C. for 30 minutes to form the cores. Cross sections of the cores were rectangular in shape having a width of 20 µm and a height of 24 µm when measured under a measuring microscope. The refractive index of the cores at a wavelength of 830 nm was 1.594.

Then, the above-mentioned material for the formation of the over cladding layer was applied to the surface of the under cladding layer by using a bar coater so as to cover the cores. Thereafter, a drying process was performed at 100° C. for 5 minutes. Next, the material for the formation of the over cladding layer was exposed to ultraviolet irradiation at 2000 mJ/cm². Thereafter, a heating treatment was performed at 120° C. for 15 minutes to form the over cladding layer. In this manner, a film element having a thickness of 100 µm and formed with a portion which was to serve as an optical waveguide having a specific refractive index of 3.3% was formed on a board in a stacked manner.

Manufacture of Optical Waveguide Device

A laminate of the board and the film element was die-cut with a cutting die having blades listed in Table 1 below. This provided an optical waveguide device having a length of 3 cm. The die-cutting was performed from the board side in Inventive Examples 1 to 4 and Comparative Example 2, and was performed from the side of the film element in Comparative Examples 1, 3 and 4. The die-cutting was performed at a rate of 80 times (shots) per minute (i.e., 80 spm).

Evaluation of Arithmetic Mean Roughness (Ra) of Blade Surfaces and Cut Surfaces

The arithmetic mean roughness (Ra) of the blade surfaces of the above-mentioned blades and the cut surfaces was measured under a laser microscope (1LM21H available from Lasertec Corporation) and calculated. Measured were portions of the blade surfaces which had an area of 30 µm by 40 µm and portions of the optical waveguide device near the cross sections of the cores which had an area of 80 µm by 80 µm. The results of measurement were also shown in Table 1 below.

Calculation of Coupling Losses

A front end surface of a multi-mode fiber having a core diameter of 9 µm was joined to a first end surface (cut surface) of each of the cores of the obtained optical waveguide device. A VCSEL (Vertical Cavity Surface Emitting Laser) light source having a wavelength of 850 nm was connected to a rear end surface of the multi-mode fiber. Laser light was emitted from the VCSEL light source, and the laser light exiting from second end surfaces (cut surfaces) of the respective cores was collected by a lens and detected by a photodetector. Thus, all propagation losses at this time were calculated. Then calculated were the propagation losses (coupling losses) due to the joining, assuming that the propagation losses in the optical waveguide were 0.1 dB/cm. This calculation was made using ten of the first end surfaces (cut surfaces) of the cores. Likewise, the coupling losses were calculated using ten of the second end surfaces (cut surfaces) of the cores. The average value and standard deviation of the coupling losses at a total of 20 locations were calculated and were also shown in Table 1 below as the coupling loss and standard deviation in the optical waveguide device. To join the end surface of each core and the front end surface of the multi-mode fiber together, a matching oil was used therebetween in Inventive Examples 2 and 4 and Comparative Examples 1 to 4, but no matching oil was used therebetween in Inventive Examples 1 and 3. The matching oil was used to fill a gap between the end surface of each core and the front end surface of the multi-mode fiber to prevent the propagation losses due to the gap.

Reference Examples 1 and 2

For Reference Examples 1 and 2, an optical waveguide device was provided by dicing (cutting with a rotary blade) a laminate of the board and the film element from the side of the film element. The coupling loss and standard deviation were calculated for the optical waveguide device in a manner similar to that described above. The results thereof were also shown in Table 1 below. A matching oil was used in Reference Example 2, but no matching oil was used in Reference Example 1.

TABLE 1

| | Blade | Blade Surface Roughness Ra (µm) | Die-Cutting Direction | Matching Oil | Cut Surface Roughness Ra (µm) | Coupling Loss (dB) | Standard Deviation |
|---|---|---|---|---|---|---|---|
| Ref. Example 1 | Rotary | — | — | Not Used | 0.01 | 0.44 | 0.16 |
| Ref. Example 2 | | | | Used | | 0.12 | 0.06 |
| Inv. Example 1 | Mirror | 0.013 | Board First | Not Used | 0.04 | 0.77 | 0.31 |
| Inv. Example 2 | | | | Used | | 0.16 | 0.10 |
| Inv. | Single- | 0.007 | | Not Used | 0.03 | 0.52 | 0.12 |

TABLE 1-continued

| | Blade | Blade Surface Roughness Ra (μm) | Die-Cutting Direction | Matching Oil | Cut Surface Roughness Ra (μm) | Coupling Loss (dB) | Standard Deviation |
|---|---|---|---|---|---|---|---|
| Example 3 Inv. | Edged | | | Used | | 0.10 | 0.04 |
| Example 4 Comp. Example 1 | Thomson | 0.022 | Film Element First | Used | 0.08 | 1.22 | 0.34 |
| Comp. Example 2 | | | Board First | | 0.16 | 0.88 | 0.85 |
| Comp. Example 3 | Mirror | 0.013 | Film Element First | | 0.08 | 1.21 | 0.42 |
| Comp. Example 4 | Single-Edged | 0.007 | | | 0.07 | 0.78 | 0.39 |

The results of the comparison between Inventive Examples 1 to 4 and Comparative Examples 1 to 4 in Table 1 showed that the use of flat blades including blade surfaces having an arithmetic mean roughness (Ra) of less than 0.02 μm as the blades of the cutting die for die-cutting and the die-cutting performed using the cutting die from the board side were effective in providing excellent smoothness of the cut surfaces (the light receiving end surface and the light emitting end surface) and accordingly in reducing the coupling losses. Additionally, it was found that this also reduced the standard deviation of the coupling losses to reduce variations in coupling losses. It was found that the coupling losses in Inventive Examples 1 to 4 compared favorably with those in Reference Examples 1 and 2. The time required for the cutting of the laminate of the board and the film element (i.e. the manufacture of the optical waveguide device) in Inventive Examples 1 to 4 was shorter than that in Reference Examples 1 and 2.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

What is claimed is:

1. A method of manufacturing an optical waveguide device, comprising the steps of:
    forming a board only on one surface of a film element to provide a laminate of said film element and said board, said film element including at least one future optical waveguide portion; and
    die-cutting said laminate with a cutting die to obtain the at least one future optical waveguide portion of said film element together with a portion of said board corresponding to the at least one future optical waveguide portion, thereby manufacturing an optical waveguide device including the portion of said board and an optical waveguide having a light receiving end surface and a light emitting end surface,
    wherein said cutting die includes at least blades for forming said light receiving end surface and said light emitting end surface, and said blades are flat blades including blade surfaces having an arithmetic means roughness (Ra) of less than 0.02 μm, and
    wherein the die-cutting is performed from said board side.

2. The method according to claim 1, wherein the at least one future optical waveguide portion includes a cladding layer made of an epoxy resin composition.

* * * * *